United States Patent
Clegg

[15] 3,643,354
[45] Feb. 22, 1972

[54] APPARATUS FOR ROOTED PLANT EXCAVATING

[72] Inventor: Samuel E. Clegg, 729 Bartlett Avenue, Plainfield, Ill. 60544

[22] Filed: Jan. 13, 1969

[21] Appl. No.: 790,540

[52] U.S. Cl. .................................. 37/2 R, 37/191 A, 74/89, 143/135 R
[51] Int. Cl. ............................................ A01g 23/04
[58] Field of Search ............. 37/2, 87, 80 A, DIG. 16, 191 A, 37/192 A; 214/3; 74/89.14, 89, 99; 143/135

[56] References Cited

UNITED STATES PATENTS

| | | | |
|---|---|---|---|
| 653,374 | 7/1900 | Barry | 143/135 UX |
| 1,303,399 | 5/1919 | Ryan | 37/87 UX |
| 1,390,800 | 9/1921 | Littleford | 143/135 UX |
| 1,507,460 | 9/1924 | Carroll | 37/2 |
| 1,607,784 | 11/1926 | Spangler | 37/2 |
| 2,410,203 | 10/1946 | Culley | 37/2 |
| 2,755,570 | 7/1956 | Blackburn et al. | 37/2 |
| 2,989,198 | 6/1961 | Bradley | 74/89 UX |
| 3,040,456 | 6/1962 | Pearce | 37/2 |
| 3,050,881 | 8/1962 | Brown | 37/191 X |
| 3,054,198 | 9/1962 | George et al. | 37/191 X |
| 3,163,944 | 1/1965 | Whitcomb | 37/2 |
| 3,284,932 | 11/1966 | Wendlandt | 37/2 |
| 3,310,890 | 3/1967 | Dickey | 37/2 |
| 3,512,276 | 5/1970 | Juhl | 37/2 |

*Primary Examiner*—William B. Penn
*Assistant Examiner*—Clifford D. Crowder
*Attorney*—Pendleton, Neuman, Williams & Anderson

[57] ABSTRACT

An excavating apparatus for digging a plant and root ball. In one embodiment the apparatus is adapted for attachment to a power source, and has a curvilinear cutting arm rotatable with respect to a positionable support frame and a digging member attached to the frame to dig a hole to allow a portion of the frame to descend into the ground with the curvilinear cutting arm. The method of excavating a rooted plant by digging a curvilinear channel vertically into the ground adjacent the plant to be excavated, arcuately under the rooted plant to a point directly below the plant, retracing the path of the channel to remove the digging apparatus from the ground, digging a curvilinear channel vertically into the ground adjacent the plant opposite the first channel, arcuately under the rooted plant to a point directly below the plant, and lifting the undercut plant and its protective soil ball from the ground.

23 Claims, 17 Drawing Figures

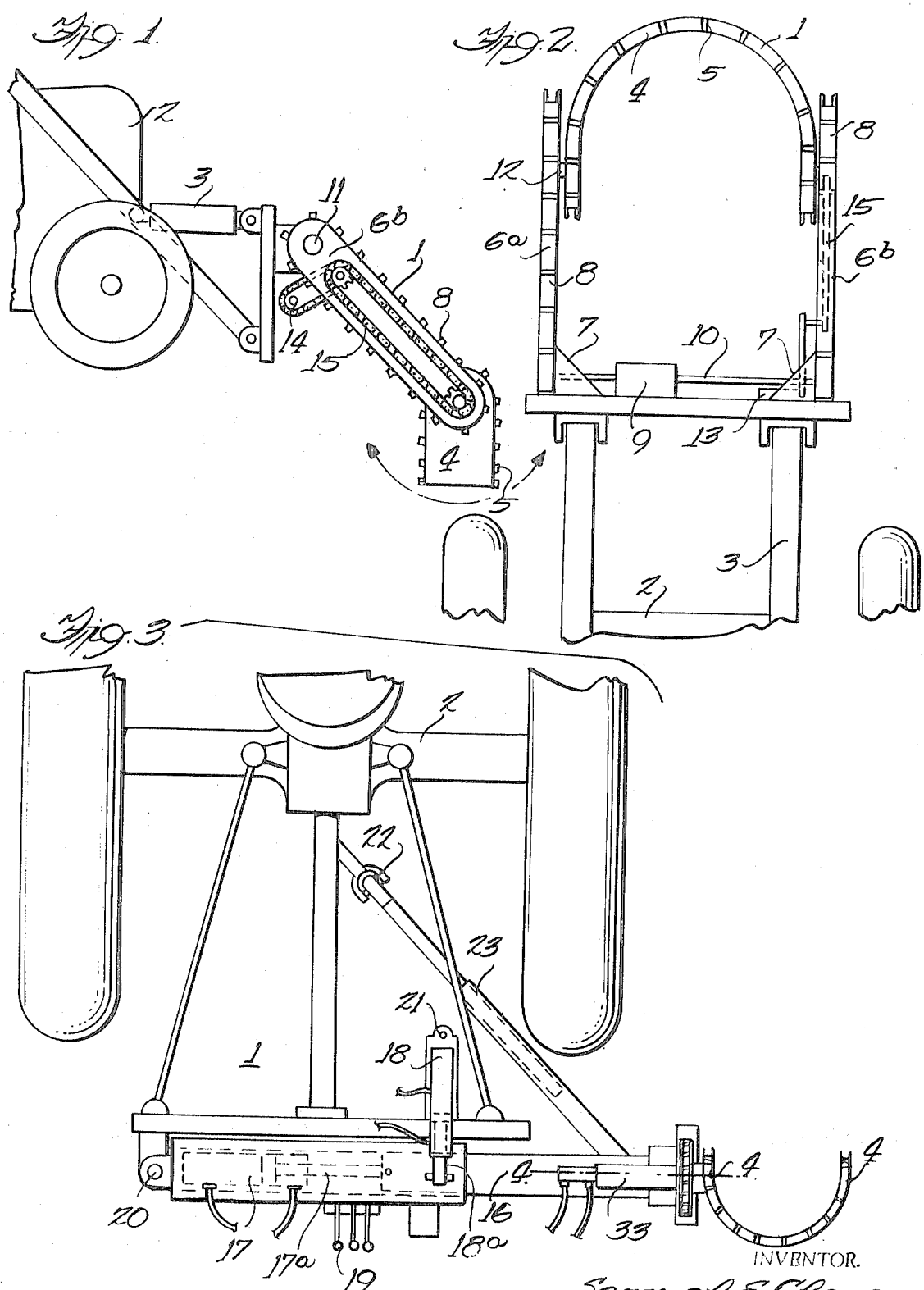

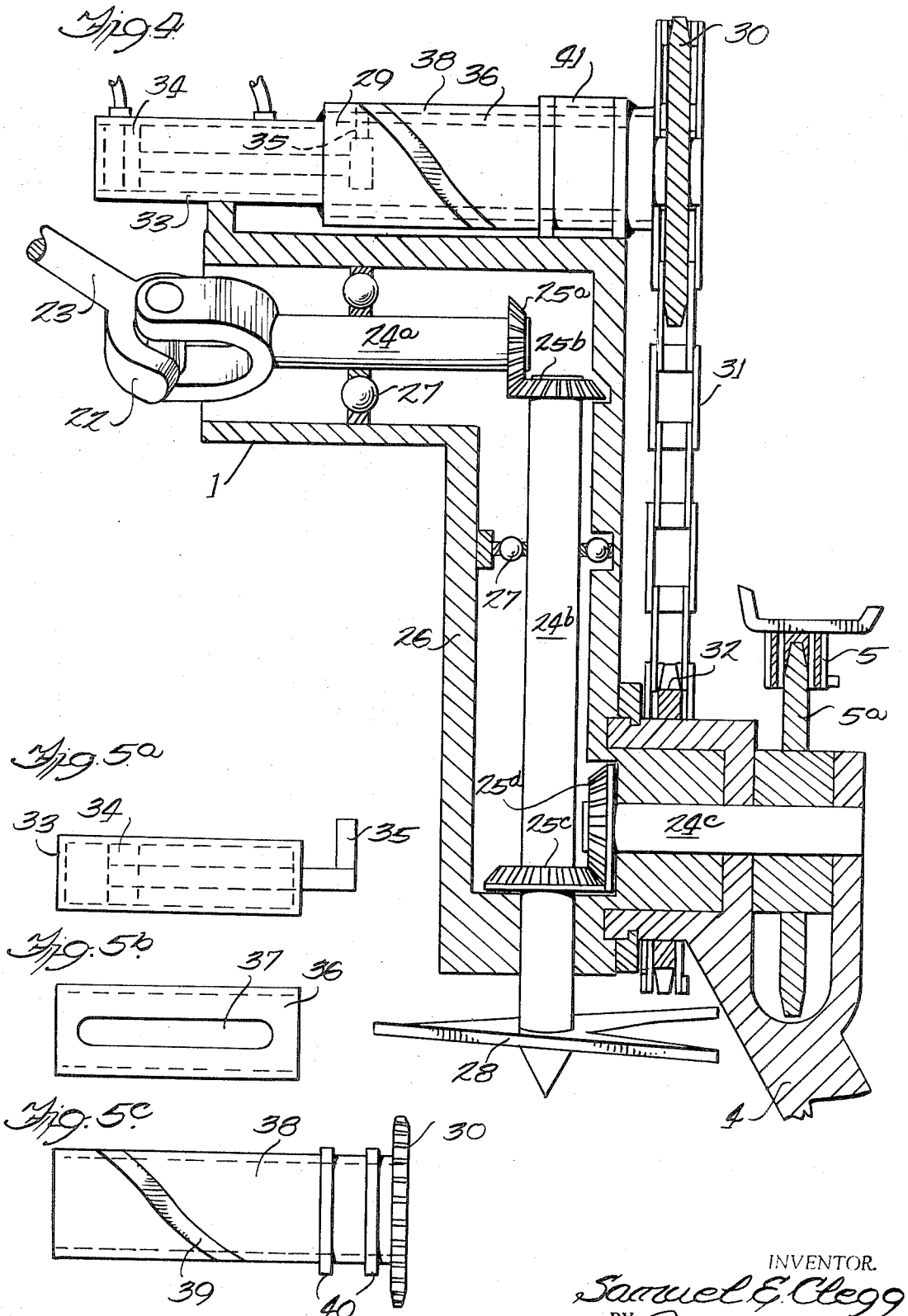

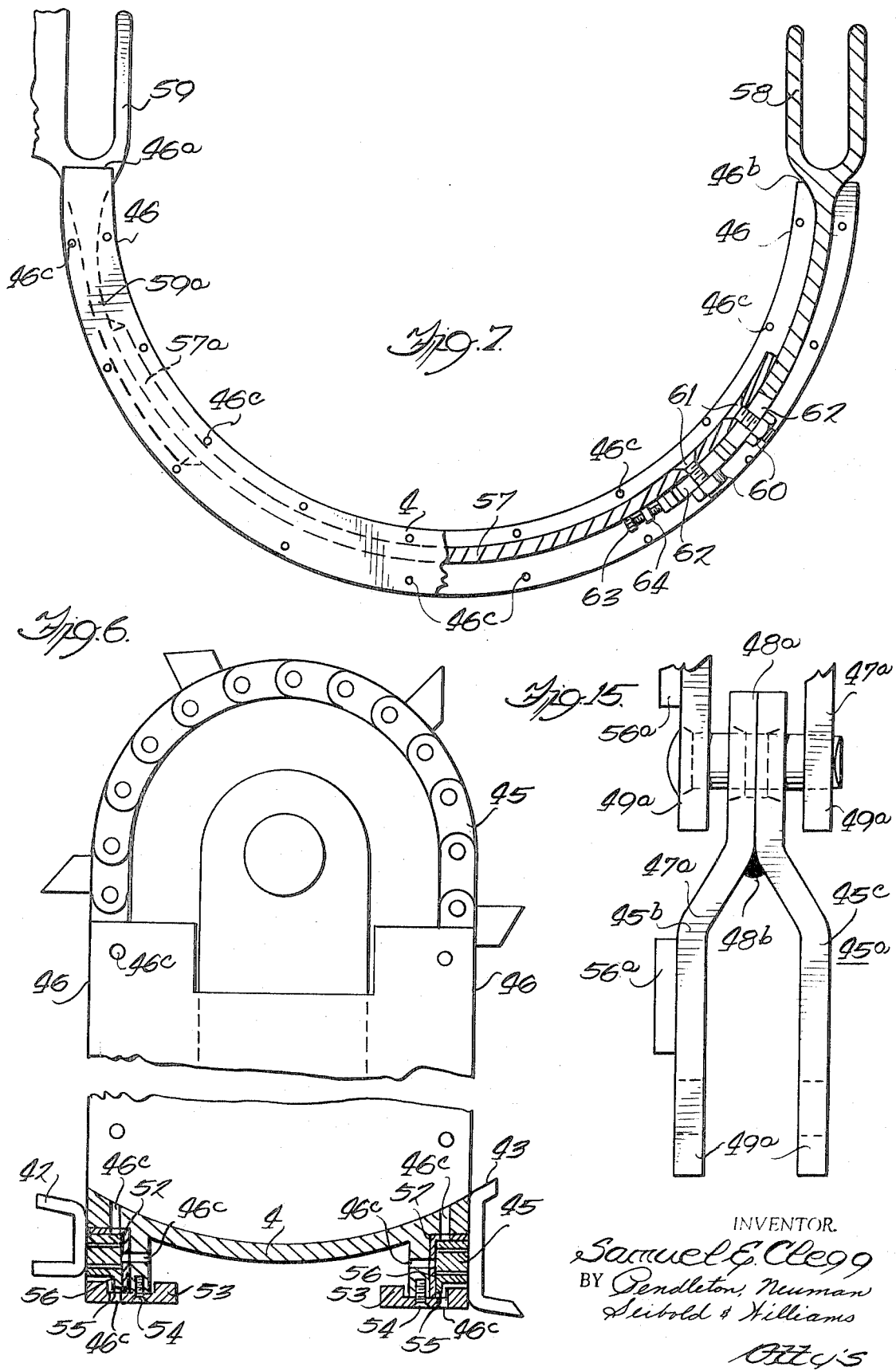

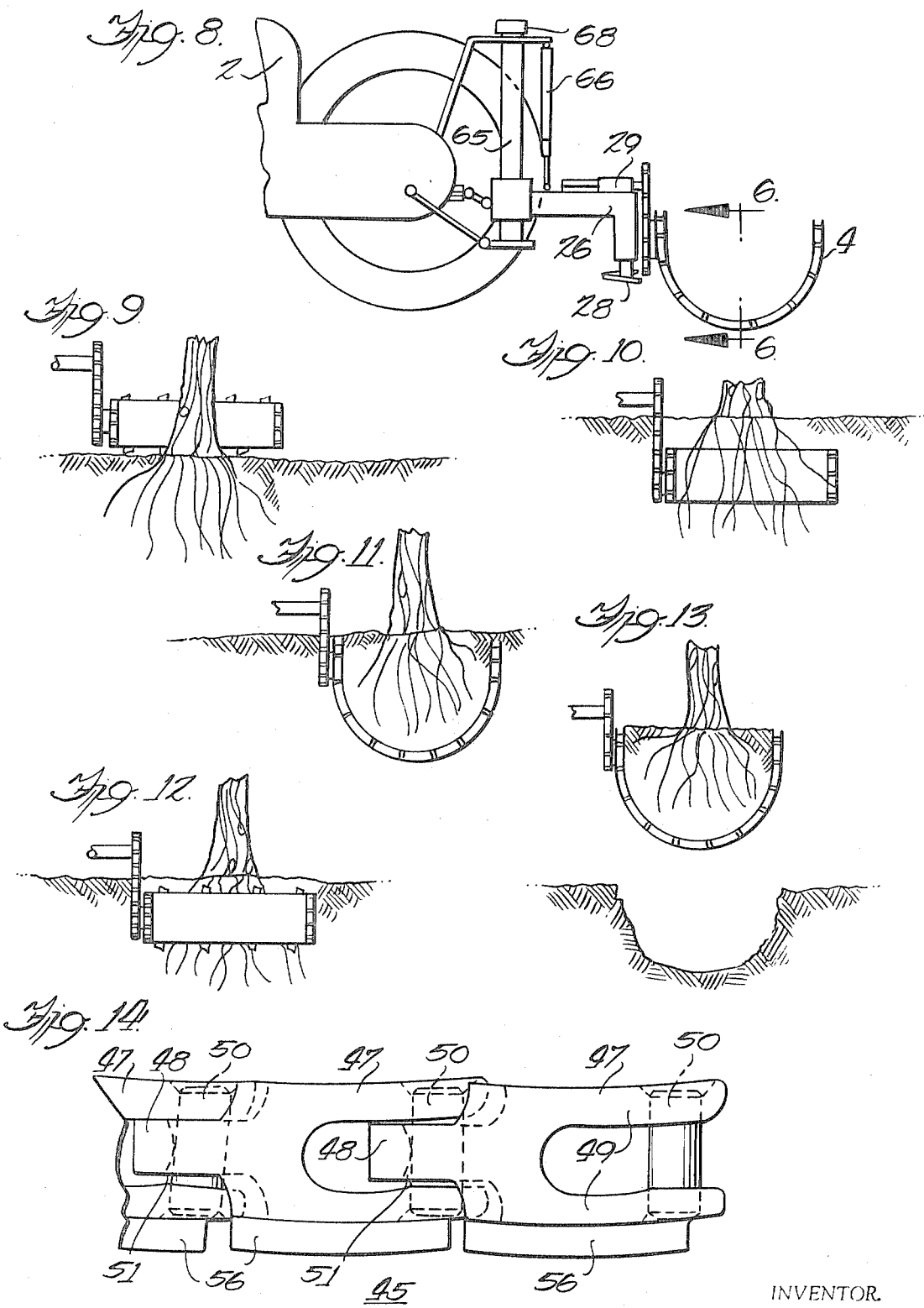

APPARATUS FOR ROOTED PLANT EXCAVATING

BACKGROUND OF THE INVENTION

1. Field of the Invention

This invention relates to the excavation of rooted plants, particularly excavation wherein it is desirable that a ball of soil surrounding the roots be excavated with the rooted plant to protect the roots from damage and to minimize the trauma to the plant normally associated with transplantation. This invention relates to an improved method for excavating a rooted plant and to improved apparatus for use in practicing this method. As will be seen below, the configuration of the root ball of soil produced by the present invention is not a spherical ball, and it should be understood that this term has been used, as it is generally used by nurserymen, to denote the protective soil surrounding the roots of a plant during transplantation, no matter what its shape.

Proper nursery technique dictates that a soil ball surrounding the roots of a plant to be transplanted have a depth which is somewhat greater than the horizontal radius of the soil ball. This is necessitated by the fact that generally speaking the major roots of a plant extend vertically into the ground from the base of a trunk rather than horizontally just under the surface. It is axiomatic that the greater the amount of the root of a plant which is included in the soil ball, the greater the chance of successful transplantation of the plant. It is desirable, therefore, in soil ball formation to minimize the amount of generally rootless soil adjacent the base of the trunk and near the surface of the ground, while maximizing the amount of heavily rooted soil lying in the area below the trunk or stem of the plant.

Another important consideration for the nurserymen is that the lower portions of the soil ball should not have a surface configuration which includes sharp corners or angles near 90°. The compressive forces holding a soil ball together are generally not very great, and consequently care is required to keep a soil ball from disintegrating. Disintegration of the protective ball exposes the roots of a plant to physical damage as well as the drying effects of the air, and reduces the possibility of successful transplantation. Sharp corners of a soil ball are generally weak and will often crumble at the slightest mishandling. It is desirable, therefore, to form a soil ball having a hemispherical base which is less likely to break apart upon rough handling.

Therefore, a preferred shape for a soil ball is a cylinder having a hemispherical base wherein the depth of the soil ball is greater than the radius of the top of the soil ball.

It is the principal object of this invention to provide improved apparatus and methods for excavating a rooted plant quickly, efficiently and with a minimum of hand labor while at the same time forming a soil ball surrounding the roots in the shape of a cylinder with a hemispherical bottom and a depth greater than its horizontal radius at the top.

2. Description of the Prior Art

Apparatus for the excavation of trees for transplantation in the past has included a hand spade and standard trenching apparatus. By trenching apparatus is meant a machine designed to dig a trench having generally straight sidewalls. A trencher of this description is sometimes used for the excavation of plants by disposing the trencher adjacent the base of the plant to be excavated at an oblique angle to the ground, and then digging at this oblique angle toward a point beneath the plant. This procedure is then repeated on the opposite side of the tree and a V-shaped undercut is formed. This V-shaped undercutting technique is sometimes used when a full row of plants are to be excavated. Hand spading is usually necessary to loosen the soil between adjacent trees and for shaping the soil ball surrounding the roots of the plant.

U.S. Pat. No. 2,990,630 titled "Tree Moving Machine" and issued to Crawford, discloses an apparatus in which a pair of quarter-spherical shells are hinged for rotation beneath a tree to be excavated, thereby forming a hemispherical tree ball. Such machines are very costly. Also as discussed above, this is not an ideal configuration for the soil ball surrounding the roots of the tree. The soil near the flat edge of the hemisphere, i.e., the surface soil, contains few roots, and therefore does little to help a plant successfully withstand the traumas of transplantation while adding both weight and bulk. On the other hand, if the amount of surface soil is reduced the soil directly below the trunk of the tree which is generally heavy in root population, is cut off at a proportionally shallow depth, namely, the radius of the top portion of the soil ball.

SUMMARY OF THE INVENTION

In the practice of one mode of this invention, a plant excavating apparatus is provided including a curvilinear cutting arm configuration having a continuous chain carrying cutting teeth disposed to run on its edge. This curvilinear cutting arm is connected either by a single or double connection to a frame, which frame may in turn be connected to either the front, side or rear of any suitable mobile power unit such as a tractor. The curvilinear cutting arm is at least partially rotatable with respect to its supporting frame, and in addition the curvilinear cutting arm may descend vertically into the ground. Digging means are provided adjacent the connection between the curvilinear cutting arm and its supporting frame, so that this connection may also descend into the ground when the curvilinear cutting arm descends vertically into the ground.

This apparatus solves one of the major problems previously existing in the art, namely, how to form a properly shaped soil ball with a minimum of hand labor and expensive machinery. The curvilinear cutting arm of the present invention is first positioned adjacent the plant to be excavated so that the stem or trunk of the plant defines an axis through the center of the circle partially defined by the arc of the curvilinear cutting arm. The cutting arm is then allowed to cut vertically into the ground for a suitable distance, such distance being dependent upon the size of the soil ball desired. After a proper depth is reached, the curvilinear cutting arm is rotated 180° about its connection or connections with the supporting frame to form the hemispherical base of the soil ball. The curvilinear cutting arm is then allowed to cut vertically to the surface of the soil to complete formation of the soil ball. The path of the cutting arm may then be retraced halfway so that the curvilinear arm is directly below the stem or trunk of the plant to be excavated, and the plant and protective soil ball may then be lifted from the ground. Alternatively, the first vertical cut may be followed by 90° rotation of the curvilinear cutting arm, removal of the cutting arm from the ground by retracing the newly formed channel, and repeating this procedure on the opposite side of the plant till the plant is completely undercut and may be lifted from the ground.

DESCRIPTION OF THE DRAWINGS

FIG. 1 is a right side view of a first embodiment of an excavating apparatus embodying the features of the present invention, including a fragmentary view of a conventional mobile power unit.

FIG. 2 is a plan view of the apparatus of FIG. 1, including chain links and cutting teeth shown in schematic form.

FIG. 3 is a plan view of a second embodiment of an excavating apparatus embodying the features of the present invention, including a fragmentary view of a conventional mobile power unit.

FIG. 4 is an enlarged, fragmentary sectional view taken along 4—4 of FIG. 3.

FIGS. 5(a), 5(b) and 5(c) comprise an exploded view of the cutting arm rotating mechanism shown in FIG. 4.

FIG. 6 is an enlarged, fragmentary sectional view taken along 6—6 of FIG. 8.

FIG. 7 is a left side view of FIG. 6 with the cutting chain and sprocket deleted, and with a sectional view of the remainder of the cutting arm, showing the adjustable connection, added.

FIG. 8 is a left side view of a third embodiment of an excavating apparatus embodying the features of the present invention, including a fragmentary view of a conventional power unit.

FIG. 9 is a fragmentary, schematic view of the curvilinear cutting panel of an excavating apparatus embodying the features of the present invention, positioned adjacent a plant to be excavated.

FIG. 10 is a fragmentary, schematic view of the apparatus of FIG. 9 the cutting arm having dug vertically into the ground adjacent the plant.

FIG. 11 is a fragmentary, schematic view of the apparatus of FIG. 9 the cutting arm having rotated 90° from the position of FIG. 10 to a point directly below the stem of the plant.

FIG. 12 is a fragmentary, schematic view of the apparatus of FIG. 9 the cutting arm having dug vertically into the ground adjacent the plant opposite the showing of FIG. 10.

FIG. 13 is a fragmentary, schematic view of the apparatus of FIG. 9 lifting the excavated plant and soil ball from the ground.

FIG. 14 is a plan view of a section of one embodiment of the cutting chain of an excavating apparatus embodying the features of the present invention, the cutting teeth not being shown.

FIG. 15 is a plan view of a section of a second embodiment of the cutting chain of an excavating apparatus embodying the features of the present invention, the cutting teeth not being shown.

DESCRIPTION OF THE PREFERRED EMBODIMENTS

While the invention has been shown and will be described in some detail with reference to a particular, exemplary embodiment thereof, there is no intention that it be limited to such detail. Quite to the contrary, it is intended here to embrace all modifications, alternatives and equivalents falling within the spirit and scope of the invention defined by the appended claims.

Referring now to the drawings and more specifically to FIGS. 1 and 2, a plant excavator 1 is shown attached to a mobile power source 2, in this case a rubber-wheeled tractor. The plant excavator may be positioned by movement of support means 3, in this embodiment a conventional, hydraulic, front end lift mechanism. Any other mobile power source such as a treaded tractor or truck could also be used, and the plant excavating apparatus could be attached to the front, sides or rear of the mobile power source as would be convenient, and as is shown in FIGS. 3 and 8.

The excavating apparatus of FIGS. 1 and 2 includes a curvilinear arm 4 having a cutting chain 5, shown schematically in FIG. 2, running around its edge in a slot. The configuration of this slot will be discussed more fully with reference to FIG. 6. The curvilinear arm 4 is connected near both ends to a pair of support members 6(a) and 6(b), which in turn are attached, by means of braces 7, to the support means 3. Support members 6(a) and 6(b) include cutting chains 8 running in slots on their edges, which chains are driven by a conventional hydraulic motor or other power source 9, through drive shaft 10, and a conventional sprocket system shown schematically at 11. The cutting chain on support member 6(a) in turn drives cutting chain 5 on the curvilinear arm 4 through a conventional double sprocket and axle connection 12. Cutting chain 5 may ride around the other end of the curvilinear arm in either a free sprocket or a continuation of the slot on the edge of the curvilinear arm. In another embodiment, cutting chains 8 may be driven separately by a pair of hydraulic motors having opposing drives, in which case conventional double sprocket systems are associated with each end of curvilinear arm 4, and cutting chain 5 is driven through the sprockets at both ends of arm 4.

A second hydraulic motor or other power source 13 is provided to rotate the curvilinear arm itself during excavation. Power source 13 rotates a sprocket 14 (FIG. 1), which through a conventional chain and sprocket system 15, disposed within the support member 6(b), imparts rotation to the curvilinear arm 4.

FIG. 3 discloses a second embodiment of the excavating apparatus connected at the rear of a conventional tractor 2. The embodiment of FIG. 3 is especially well suited for nursery use where the plants to be excavated are in rather narrow rows, and particularly in cases where not every plant in a row is to be excavated. The apparatus of FIG. 3 is provided with a telescoping support 16 activated by a conventional hydraulic piston 17a and cylinder 17, whereby the cutting arm 4 may be alternately extended for use and withdrawn behind the tractor for passage by plants which are not to be excavated. A second conventional hydraulic cylinder 18 and piston 18a are provided for positioning the curvilinear cutting arm 4 in a direction transverse to the positioning movements supplied by piston 17a and cylinder 17. Movement of the curvilinear cutting arm 4 in the above directions, and movement of the entire plant excavator 1 in the vertical direction through use of the conventional rear end lift mechanism of the tractor such as a three-point hitch, may all be controlled by the control levers 19. To allow free movement of the excavating apparatus in the above directions, telescoping support 16 is mounted on pivot 20 and cylinder 18 is located on point 21. Any means equivalent to hydraulic cylinders and pistons may be provided to position the curvilinear cutting arm.

The digging teeth and chain 5 are driven around the cutting arm 4 by a telescoping shaft 23 including universal joint 22. The shaft 23 is generally connected to the power take off of the tractor 2. The entire curved arm 4 is rotated through an arc of about 180° by the additional hydraulic cylinder 33.

FIG. 4 illustrates one embodiment of a drive and rotation mechanism for rotation of arm 4 and motion of the cutting chain 5 in the excavating apparatus of FIG. 3. Driving power is transmitted from the power take off at the rear end of the tractor and shaft 23 through a second standard universal joint 22 (FIG. 4).

Rotational movement of the cutting chain driving sprocket 5a is provided through a series of shafts 24 a–c and bevel gear connections 25 a–d. These shafts and gears are disposed in a casing 26 where they ride in ring bearings 27. In the embodiment of FIGS. 3 and 4 a spiral auger 28 is provided for digging a hole to allow casing 26 to descend into the ground with the curvilinear arm 4 during excavating operations. Rotation is transmitted to the spiral auger from the universal 22 through the shafts 24 a–c and bevel gears 25 a–d. This auger 28 performs the same function as the cutting chains 8 on support members 6(a) and 6(b) in FIGS. 1 and 2. These digging means, by providing a hole in the ground to allow a portion of the support for the curvilinear arm to descend into the ground, enable this excavating apparatus to form a soil ball surrounding the roots of the plant having cylindrical sides and a hemispherical bottom.

Hydraulic piston and cylinder apparatus 29 is provided for rotating sprocket 30 which rotation is transmitted to the curvilinear arm 4 through the chain 31 and the sprocket 32 fixed to the curvilinear arm 4.

FIGS. 5(a)–5(c) better illustrate the components of the apparatus 29 of FIG. 4. FIG. 5(a) shows a conventional hydraulic cylinder 33 having a piston 34 slidably mounted therein. A finger 35 is transversely mounted on the arm of piston 34. FIG. 5(b) discloses an inner sleeve 36 having a longitudinal slot 37. In construction of the apparatus 29, sleeve 36 is fixedly connected to casing 33 so that the finger 35 extends through slot 37. FIG. 5(c) shows an outer sleeve 38 having a sprocket 30 at one end and a helical slot 39 running longitudinally through 180°. Ridges 40 are provided for engagement with collar 41 (FIG. 4) for connection to frame 26. In construction inner sleeve 36 is disposed within outer sleeve 38 so that finger 35 extends not only through longitudinal slot 37 but also through helical slot 39. Outer sleeve 38 is rotatably disposed within collar 41 (FIG. 4), while cylinder 33 is fixedly connected to casing 26. Longitudinal movement of piston 34 which causes finger 35 to move from one end of slot 37 to the other consequently causes outer sleeve 38 and sprocket 30 to rotate through 180°. This rotation is transmitted through chain 31 and fixed sprocket 32 to the curvilinear arm 4.

The arcuate cross section of the curvilinear arm 4 (FIG. 6) provides both better shaping of the hemispherical base of the soil ball during excavation and also a more stable base for the soil ball during lifting of the excavated plant and soil ball from the ground. The arc of the arcuate cross section of curvilinear arm 4 is uniquely related to the width of the cutting teeth disposed on this arm, in that the arc may not be so great as to cause the central portion of arm 4 (FIG. 6) to extend beyond the width of tooth 43. This relationship is necessitated by the fact that during vertical digging, arm 4 must follow the channel cut by tooth 43, and any extension of the arm outside the width of this tooth would prevent the arm from passing between the walls of the newly formed vertical channel.

Although it is understood the cutting teeth and tooth carrying chain of the present invention may be of any shape or construction so long as they perform the function of undercutting a rooted plant to be excavated, particular tooth shapes and chains have been found to be more desirable than others. In one cutting chain, center sweeping teeth 42 (FIG. 6) are alternately provided with side cutting teeth 43 attached to a chain 45 (FIG. 6). The side cutting teeth 43 are provided with two cutting surfaces spaced transversely of the chain 45 at a distance sufficient to cut a channel through the ground wide enough that the curvilinear arm 4 and the chain holding slot 46, disposed on the edge of said arm, may pass freely through the soil. Center sweeping teeth such as tooth 42 are provided with two cutting surfaces disposed transversely of the chain 45 a lesser distance than the cutting surfaces of tooth 43. The cutting surfaces of tooth 42 act not only as cutting means but also as sweeping means for carrying loosened dirt to the ends and rear of the curvilinear arm as it passes through the ground. It has been found that cutting teeth need not be disposed on every link of the chain 45. Rather a side cutting tooth alternated with a center sweeping tooth and with 3 or 4 links of the chain therebetween provides both economy in construction and efficiency in operation. As a general rule, however, it may be stated that the greater the number of teeth on the cutting chain, the smoother the resulting cut. Teeth 42 and 43 may be either welded to the chain 45, or links, including teeth, may be unitarily cast.

The chain 45 (FIG. 14) may be composed of a series of uniform cast links 47, each link having a forward tongue portion 48 and a rearward double flange portion 49. The links 47 are connected by means of pins 50 which extend through holes 51 in the forward tongue portion of one link, and between the double flange portions 49 of the next forward link in the chain. In order to prevent inordinate wear to the chain, and the lengthening of the chain caused thereby, the bearing walls of the holes 51 of each link are swedged or shaped to flare.

The shape of each link 47 of the chain 45 is such that the chain flexes freely in transverse planes as is required in its movement around the edge of the curvilinear arm 4. FIG. 15 discloses a segment of a second flex chain 45a which may also be used in conjunction with the present invention. Flex chain 45a is also composed of a series of uniform links 47a which include a forward tongue portion 48a and a rearward double-flange portion 49a. Link 47a is fabricated by connecting identical pieces 45b and 45c together at the forward tongue portion 48a by a weld 48b, and then welding transverse projections 56a to one of the rearward flange portions 49a.

The slot 46 (FIG. 6) disposed on the edge of the curvilinear arm 4 in which the cutting chain 45 rides, includes a wear ring 52 and a chain guide 53. As is shown in FIGS. 6 and 7, the slot 46 extends from a point 46a just below the sprocket holder 59 on one end of the curvilinear arm, along the edge of the arm, to a point 46b just below the sprocket holder 58 on the opposite end of the arm. Slot 46 includes openings 46c in the walls thereof (FIGS. 6 and 7), through which dirt is expelled during digging to keep slot 46 from clogging and inhibiting movement of the cutting chain. Openings 46c may be defined by a number of round holes, as shown in the drawings, or may be defined by a number of larger, generally rectangular openings, likewise disposed seriatim in the walls of slot 46. The wear ring 52 disposed within this slot is an arcuate member having an L-shaped cross section. As is seen in FIG. 6, openings 46c extend not only through slot 46, but also through wear ring 52. Due to the pressure on the forward edge of the cutting arm 4 as it moves through the ground, the wear ring 52 on the forward edge of the cutting arm 4 is subjected to greater wear forces than the wear ring 52 on the rear or following edge of the cutting arm. The identical construction of the forward and rear wear rings, however, allows them to be interchanged, and after the forward ring has worn a given amount it may be reversed with the rear wear ring.

In like manner, the chain guides 53 on the forward and rear edges of the cutting arm are also interchangeable. Chain guides 53 are connected to the curvilinear arm 4 by machine screws 54 or other suitable means, so that the chain guide 53 and curvilinear arm 4 form a recess 55 with which the transverse projection 56 (FIGS. 6 and 14) on each link 47 of the cutting chain engages.

The curvilinear arm 4, shown in FIG. 7, comprises the center web member 57 having two sprocket holders 58 and 59 secured to its ends. Sprocket holder 59 is shown welded to the center web 57 along weld line 57a, but it is obvious that the center web 57 and the web 59a of this sprocket holder could be a unitary piece. Sprocket holder 58, however, is adjustably connected to the center web 57 to provide a method for tightening the cutting chain, a procedure which is normally necessary after extended use of any chain cutting device. Nuts 60 and bolts 61 extend through both countersunk holes in the center web 57 and slots 62 in the sprocket holder 58. During normal excavating operations nuts 60 are advanced on bolts 61 to press sprocket holder 58 and center web 57 together to prevent slippage between these respective pieces. To take up slack in the cutting chain, nuts 60 are loosened, sprocket holder 58 advanced so that bolts 61 are in a different position with respect to slots 62, and the nuts 60 retightened. To aid in advancement of the sprocket holder 58 during chain tightening and provide positive, permanent adjustment, screw 63 is provided to run through the internally threaded member 64 and against the end of the sprocket holder 58. Rotation of screw 63 so that the screwhead approaches member 64, after nuts 60 have been loosened, results in extension of sprocket holder 58 with respect to center web 57. Screw 63 thus provides a means for moving sprocket holder 58 to tighten the cutting chain, as well as an additional means for preventing slippage of the sprocket holder during excavation.

A third embodiment of the excavating apparatus invention disclosed herein, is shown in FIG. 8, this embodiment being pivotally attached to the rear of a conventional tractor 2. The curvilinear cutting arm 4, the arm rotation apparatus 29, the spiral auger 28, and the drive apparatus within casing 26 are the same as the corresponding parts disclosed above with respect to the second embodiment. However, this embodiment discloses additional positioning means. The excavator apparatus is slidably mounted for vertical, but not rotational, movement on and with respect to column 65. A conventional hydraulic cylinder and piston 66 are provided for moving the apparatus vertically on column 65. A conventional hydraulic rotator 68 is provided for rotating column 65, which in turn, causes the excavator apparatus itself to pivot arcuately behind the tractor. The above described positioning means allow the curvilinear cutting arm 4 to be moved both in the vertical direction and pivotally in an arc of approximately 180° behind the mobile power source. In all three of the embodiments disclosed herein it is understood that control levers could be so situated that the operator of the mobile power source could also operate the excavator apparatus without dismounting.

FIGS. 9-13 schematically illustrate the excavating method of the present invention. It is understood that the apparatus pictured in these views is only representative of the apparatus which has been described in more detail with reference to FIGS. 1-8 and 14. In FIG. 9 the curvilinear cutting arm is shown positioned adjacent a plant to be excavated. In operation, power is supplied to the apparatus and a curvilinear channel is dug vertically into the ground to a proper depth. The proper depth will depend upon the size of the plant being excavated, but will always be greater than the cross section of the cutting arm so that the entire cutting chain will be below ground level as shown in FIG. 10. Having reached a proper depth, the curvilinear cutting arm is rotated 90° so that the arm is directly below the plant as shown in FIG. 11. Rotation may be continued an additional 90° until the arm is again in the vertical position directly opposite the position of FIG. 10 as shown in FIG. 12, and the arm may then be raised vertically until the front cutting teeth cut through the surface of the ground and the plant is completely undercut. The path of the cutting arm may then be retraced until the arm is again directly below the plant as shown in FIG. 11. Alternatively, the path of the cutting arm may be retraced after the first vertical cut and 90° rotation, and a second vertical cut and 90° rotation made adjacent the plant on the opposite side of the first vertical cut. In either case, the plant is completely undercut, and the cutting arm which is directly below the plant may be used to lift the plant and surrounding protective soil ball from the ground (FIG. 13), where it may then be wrapped in burlap or any other material normally used in nursery practice to protect a soil ball. As is apparent, the final steps may be modified if other means are provided for lifting the plant and ball from the hole for further processing. For instance, if the plant is undercut by the first method described above, a piece of burlap, or other material, may be trailed behind the cutting arm such that completion of the cut results in the burlap being disposed in the newly cut channel. The plant and soil ball may be removed from the hole easily, and without damage thereto, by grasping and lifting the exposed corners of the burlap.

The invention having thus been described, what is claimed and desired to be secured by Letters Patent is:

1. Apparatus for excavating a rooted plant and soil ball from the surrounding soil, said soil ball having a generally cylindrical portion subtended by a generally spherical portion, said apparatus including drive means, first driven means coupled to said drive means for cutting an arcuate channel in said soil to define the generally spherical portion of the soil ball, positioning means connected to said first driven means for positioning said driven means with respect to the plant to be excavated, second driven means coupled to said drive means and disposed adjacent the connection between said first driven means and said positioning means for excavating said soil adjacent said rooted plant and ball whereby a portion of said positioning means descends into the ground with the first said driven means to define said generally cylindrical portion prior to the formation of said spherical portion by said first driven means.

2. The apparatus of claim 1 wherein the first driven means for cutting a channel to define the soil ball includes curvilinear arm means for cutting said ball, means for rotating said arm means through an arc, and an endless cutting chain running in a slot on the edge of said curvilinear arm means.

3. The apparatus of claim 2 including a driving sprocket connected adjacent one end of the curvilinear arm means, a freely rotatable sprocket connected adjacent the opposite end thereof, the cutting chain being operably engaged with said sprockets and adapted to ride between the sprockets in a slot on the edge of said curvilinear arm means.

4. The apparatus of claim 2 wherein the cutting chain includes longitudinally interspersed side cutting teeth defining the width of the channel cut thereby and center sweeping teeth to remove the free soil from said channel.

5. The apparatus of claim 2 wherein the means for rotating the curvilinear arm means includes a first sprocket fixedly connected to said curvilinear arm means, a second sprocket fixedly connected to said drive means, and an endless chain operably connecting the two sprockets to transmit rotation and rotate said arm.

6. The apparatus of claim 5 wherein the drive means for rotating said arm includes rotating outer sleeve having a helical groove and secured to said second sprocket, an inner sleeve having a longitudinal slot fastened to one end of an extensible hydraulic device, a transverse projection disposed on the other end of said hydraulic device, said projection extending outwardly through said slot and cooperating with said helical groove whereby axial extension of said piston is translated into rotation of said second sprocket.

7. The apparatus of claim 5 wherein the second sprocket is operatively connected to and rotated by a hydraulic motor.

8. The apparatus of claim 2 wherein the curvilinear arm means includes a first curvilinear portion having a driving sprocket on one end, a second curvilinear portion adjustably connected to the other end of said first portion for taking up slack in an endless cutting chain, said second portion having a free revolving sprocket on its unconnected end.

9. The apparatus of claim 2 wherein the slot on the edge of the curvilinear arm means includes a wear ring means lining said slot and chain guide means retaining said chain in said slot, said ring means and said chain guide means being reversible to expose a plurality of different surfaces to wear.

10. The apparatus of claim 2 wherein the cutting chain includes a series of interconnected uniform links, said chain links having curved interconnecting faces to flex in at least two planes.

11. The apparatus of claim 10 wherein each link includes a forward tongue portion and a rearward double flange portion, said tongue portion including a shaped aperture through which a pin extending between the double-flange portions of the next forward link in the chain extends to permit flexure in at least two planes.

12. The apparatus of claim 10 wherein each link includes a transverse projection for engagement with a chain guide on the edge of the curvilinear arm means.

13. The apparatus of claim 1 wherein the means for positioning the means for cutting a channel to define a soil ball includes a frame connected to said cutting means, a first means attached to said frame for moving the cutting means in a first direction in the horizontal plane, and a second means attached to said frame for moving the cutting means in a second direction in the horizontal plane, transverse said first direction.

14. The apparatus of claim 13 wherein the means for moving the cutting means in transverse directions in the horizontal plane are hydraulic cylinders and pistons connected thereto.

15. The apparatus of claim 13 wherein the frame is moved in the vertical plane by a lifting means connected to a mobile power source.

16. The apparatus of claim 1 wherein the means for positioning the first driven means for cutting a channel to define a soil ball includes a frame connected to both ends of said cutting means, said frame in turn connected to a lift means connected to a mobile power source.

17. The apparatus of claim 16 wherein cutting chains to allow a portion of the frame to descend into the ground with said first driven means are disposed adjacent both connections between the first driven means and the frame.

18. The apparatus of claim 1 wherein the means for positioning the first driven means for cutting a channel to define a soil ball includes a frame connected to said cutting means, a first means for moving said frame in the vertical plane, a second means for pivotally moving said frame in an arc about a connection between the frame and a mobile power source.

19. The apparatus of claim 18 wherein the first means for moving said frame includes a vertical column upon which said frame is mounted for movement in the vertical plane, a hydraulic cylinder for moving said frame vertically on said column, and the second means for pivotally moving said frame includes a hydraulic device for partially rotating said vertical column and the attached frame.

20. The apparatus of claim 1 wherein the means for digging a hole to allow a portion of the positioning means to descend into the ground with said first driven means includes a spiral auger.

21. The apparatus of claim 1 wherein the means for digging a hole to allow a portion of the positioning means to descend into the ground with said first driven means includes a cutting chain.

22. An apparatus for excavating a plant, including a portion of its roots and a protective soil ball, said soil ball having a generally cylindrical portion subtended by a generally spherical portion, said apparatus comprising mounting means, a chain digger disposed on a curvilinear frame secured to said mounting means, a power source connected to drive said chain digger, said chain digger and said frame being rotatable through an arc to define said generally spherical portion, said mounting means including means for positioning the chain digger with respect to the plant to be excavated, means disposed adjacent the connection between said mounting means and said chain digger to allow a portion of said frame to descend vertically into the ground carrying said chain digger therewith to define said cylindrical portion.

23. APparatus for excavating a rooted plant and soil ball including drive means, said soil ball having a generally cylindrical portion subtended by a generally spherical portion, two adjustably connected curvilinear arm portions, said arm portions having sprockets disposed on their unconnected ends, a cutting chain disposed to run in a slot around the unconnected edges of said arm portions and said sprockets, said connected curvilinear arm portions being actuated by said drive means and rotatable through an arc with respect to a positioning means to define said generally spherical portion, means for positioning said connected curvilinear arm portions with respect to the plant to be excavated, and means actuated by said drive means for digging a hole whereby the portion of the positioning means adjacent the connected curvilinear arm portions descends vertically into the ground carrying said cutting chain therewith to define said generally cylindrical portion.

* * * * *